United States Patent [19]
Reinert, Sr.

[11] Patent Number: 5,785,409
[45] Date of Patent: *Jul. 28, 1998

[54] HEIGHT AND AZIMUTH ADJUSTABLE CONTAINERS

[76] Inventor: Gary L. Reinert, Sr., 4319 Middle Rd., Allison Park, Pa. 15101

[ * ] Notice: The term of this patent shall not extend beyond the expiration date of Pat. Nos. 5,541,362 and 5,431,510.

[21] Appl. No.: 464,736

[22] PCT Filed: Dec. 29, 1993

[86] PCT No.: PCT/US93/12640

§ 371 Date: Jun. 29, 1995

§ 102(e) Date: Jun. 29, 1995

[87] PCT Pub. No.: WO94/15833

PCT Pub. Date: Jul. 21, 1994

[51] Int. Cl.$^6$ .......................................... E01F 9/00
[52] U.S. Cl. ...................... 362/153.1; 362/285; 362/430; 174/57; 404/26; 404/72
[58] Field of Search ................. 174/57; 220/3.7, 220/3.8; 361/601; 362/153.1, 62, 418, 430, 368, 285, 289; 404/26, 72

[56] References Cited

U.S. PATENT DOCUMENTS

4,622,435  11/1986  Trainor et al. ................. 174/57
5,431,510  7/1995   Reinert, Sr. ................... 404/72
5,541,362  7/1996   Reinert, Sr. ................. 362/153.1

*Primary Examiner*—Stephen F. Husar
*Attorney, Agent, or Firm*—Douglas G. Glantz

[57] ABSTRACT

An airport inset light adjustable alignment container set provides a light fixture and support having a non-threaded vertical wall container base for airport runway, taxiway, or other aircraft ground traffic areas and means for providing variable length extension for rotatably adjusting height by plus or minus 1/64 of an inch or more and azimuth alignment by about plus or minus one degree or more. For previously installed, old airport inset lights, a variable length extension assembly of the present invention can be connected to a fixed connecting flange for rotatably adjusting the height and azimuth alignment of a conventional prior art airport inset light, e.g., one which has been previously installed without the benefit of the present invention. In one aspect, an overlay protection plate protects against paving material entering the light fixture support during airport paving operations and locates the light fixture support after the airport paving operations have covered it. The overlay protection plate is firmly held bolt-free on the light fixture support, and the pavement cover is removed in substantially one piece.

20 Claims, 7 Drawing Sheets

HEIGHT AND AZIMUTH ADJUSTABLE CONTAINERS

BACKGROUND OF THE INVENTION

1. Technical Field

This invention relates to height and azimuth adjustable container apparatus and methods and overlay protection plate apparatus and associated methods for embedded container light supports and the alignment of their light fixtures. In one aspect, the invention relates to height and azimuth adjustable containers and overlay protection plate apparatus for specialized, set-in-the-ground lighting systems utilized for the purpose of guiding pilots during approach to an airport runway and during the landing and taxi of aircraft.

2. Background

Conventional lighting fixtures forming part of specialized, set-in-the-ground airport lighting systems are mounted on certain steel containers. The steel containers for these airport inset lights can be one-part or two-part and, sometimes, three-part containers and are set below the surface of runways, taxiways, and other aircraft ground traffic areas. The bottom sections of the containers are sometimes called shallow light bases. The top sections are called fixed-length extensions and are manufactured in different fixed lengths and diameters. Flat spacer rings are installed between the extensions and the lighting fixtures for further providing height and azimuth adjustments. These conventional steel containers, in addition to serving as bases for mounting the lighting fixtures, also serve as transformer housings and junction boxes to bring electrical power to the lighting fixtures.

In the installation of airport runway touchdown zone, centerline, and edge lighting systems, as well as in the construction or installation of taxiway centerline and edge lighting systems, and other lighting systems, these containers are embedded in the runway, taxiway, and other pavements at the time the runway and taxiway pavements are poured (concrete) or placed (bituminous). These containers, hereinafter referred to as embedded containers, vary in length and diameter. The conventional, existing art containers provide an inverted flange at their top portion, which flange has a standard set of threaded holes to allow for the runway, taxiway, edge, and other light fixtures to be bolted onto them above the pavement surface, or to allow for the top section of the container to be bolted onto the bottom section, if it is a two-section container. A great majority of these existing, conventional containers are two section containers, bolted together at their inverted flanges. The light fixture is then bolted onto the top inverted flange of the top section of the two-section container. The top section of the two-section container is referred to as the fixed-length extension, which is part of the old art embedded containers.

These embedded containers below the pavement surface serve as light fixture bases. They also serve as transformer housings and junction boxes. Depending on the location where these containers are installed, they are exposed to varying degrees and types of forces applied to them by the aircraft and other vehicular traffic in that location. For example, runway and taxiway centerline light fixtures, and the containers they are bolted onto, are subjected to direct aircraft and other heavy vehicular loading applied to the top flange of the container and transmitted down to its walls.

The top portions of the lighting fixtures are installed at a close tolerance, slightly above the pavement surface. Installations of the containers and their lighting fixtures are required on two different occasions. The first is when the runways, taxiways, and other aircraft ground traffic areas are built for the first time. The second is for resurfacing or repaving of the runways, taxiways, and other aircraft ground traffic areas. The latter is the most common, i.e., most frequent.

The light fixtures installed on the embedded containers, otherwise known as airport inset lights, have to be aligned with respect to each other in a precise, straight line on the horizontal plane known as azimuth correction, and their height has to be set within a fixed, strict tolerance measured from the pavement surface.

Each airport paving project may consist of installing hundreds or thousands of lighting fixtures and their airport inset light containers.

Runways, taxiways, and other aircraft ground traffic areas deteriorate with years of usage. This creates the need for resurfacing or repaving, i.e., replacing the asphalt of these ground surfaces. Repavement is a much more common, i.e., frequent, occurrence than the construction of new pavements.

When a runway, taxiway, or other aircraft ground traffic area is first built, or when upgrading, modernizing, or maintenance projects require their resurfacing (repavement), the flanges on the embedded containers get buried under the pavement. This creates the need for height adjusting devices with flanges identical to those of the embedded containers to adapt the container up to the final surface and for the lighting fixtures to be installed and aligned above the payment. In many instances, this requires core-drilling the newly poured or placed pavement to reach down to the now buried top flange of the embedded container.

Depending on the lengths of the runways and taxiways, thousands of these embedded containers are affected, and a wide variety of height adjustments can be involved for each given size of embedded containers. At present, fixed-length extensions must be made available in many different lengths, so as to provide the many different gross height adjustments. A combination of one or more flat spacer rings, which are manufactured in thicknesses of 1/16, 1/8, 1/4, and 1/2 of one inch (1.6, 3.2, 6.3, and 12.7 millimeters, approximately), and other thicknesses, can be used to provide the final height.

These fixed-length extensions have one inverted flange on each end to bolt onto the embedded container, and then flat rings are added on top of the fixed-length extension top flange before the lighting fixture is bolted onto the flange.

The fixed-length extensions and the flat spacer rings must be individually ordered to the required length. This makes for a difficult, tedious conventional installation procedure involving (1) field measurement of each individual fixed extension length and flat spacer ring required for every container; (2) record keeping of all those field measurements for ordering and verification; (3) ordering, receiving, and delivering to the field each size according to its location; and (4) frequently having to install more than one flat spacer ring to achieve the required height. The listed complications for the difficult conventional installation procedure are further magnified by the fact that the embedded containers are made in 4 different sizes: 10, 12, 15, and 16 inches (25.4, 30.5, 38.1, and 40.6 centimeters, approximately) in diameter.

When the airport set-in-the-ground lighting system is installed for the first time, the bottom sections of the containers are generally set in a granular sub-base fill, in holes larger than the container's bottom sections. The granular sub-base fill, which can be one to two feet in height, typically constitutes the entire sub-base of the runway, taxiway, or other aircraft ground traffic area.

Electrical conduit is installed in trenches in the sub-base material and fastened to the containers. Electrical wires are pulled through and into each container, which is set precisely aligned in azimuth and height. The trenches then are filled with concrete, and concrete then is poured under and around the containers to encase and anchor them to the sub-base.

At this point, the top flange (inverted flange) of the bottom section of each container is positioned flush with the surface of the granular sub-base in which the concrete-encased container is set.

A ¾ inch (1.9 centimeters) thick plywood cover and a metal plate on top of it are bolted, with six bolts, to the top flange of each container bottom section. The container top flange has holes drilled and tapped with the same bolt circle as the plywood covers and metal plates. The top flange of the bottom section of each container, with its plywood cover and metal plate bolted on it, is set to the height of the surface of the granular sub-base. The purpose of the plywood cover and metal plate is to prevent debris from falling into the bottom section container and to prevent the container flange from being damaged during runway construction. The FAA (United States Federal Aviation Administration) designation for the metal plate is "mud plate."

If the runway, taxiway, and other aircraft ground traffic areas being built are to be constructed with bituminous material, e.g., such as asphalt, instead of concrete, a shingle or other thin material will be placed on top of the mud plates before the tack coat is applied. Prior to paving, the thin material is removed, and the mud plates are lightly wiped with rags soaked in vegetable oil to facilitate the subsequent removal of the asphalt from its surface.

A first course of asphalt, e.g., such as at a depth of four inches (10.2 centimeters) or more, is laid down, burying the mud plates under it. The asphalt then is compacted by heavy rolling machines.

For core drilling to begin, the location of each container center point then must be found. Surveyors find the approximate location of each buried container using transits and previously established reference points. The surveyor makes reference markings on the pavement to indicate approximately where the center point of each container should be found or located. The surveyed center point is required for the precise setting of a core drilling bit.

The electrical contractor then drills one or more two-inch (5 centimeters) pilot holes to the depth of the top of the mud plate. Through these pilot holes, the contractor can determine how close the surveyed center point is to the actual container center point, by observing the position of raised concentric circles or raised radial markings on the top of the mud plate.

When the precise container center point is determined, a core drilling is made with a drilling bit one inch (2.5 centimeters) larger in diameter than the diameter of the buried container. For example, Type L-868 Class I containers are manufactured, per FAA (United States Federal Aviation Administration) specification, in three sizes: A, B, and C with nominal outside diameters of 10, 12, and 15 inches (25.4, 30.5, and 38.1 centimeters), respectively. The core drilling would be 11, 13, or 16 inches (27.9, 33.0, or 40.6 centimeters), respectively.

When the core drilling is completed, jack hammers are used to break the core-drilled, compacted asphalt cylinder into smaller pieces. The jack hammer technique makes for hard work, a highly labor intensive consuming chore. As a further drawback, the jack hammering on many occasions damages the mud plate by breaking or bending one or more of its bolts.

After jack hammering, the asphalt around the six bolts of the top flange must be cleaned out by hammer and chisel to permit removal of the bolts. The debris then must be removed to prevent the debris from falling into the container below.

After the bolts are removed, it is still difficult to pry away the plywood cover and mud plate, since the work is done kneeling down, working inside a hole with very little room between the wall of the hole and the items to be removed.

After the plywood covers and mud plates are removed, a fixed-length extension is bolted onto the bottom container's top flange.

The plywood covers and mud plates are bolted down again, this time onto the fixed-length extensions, thereby bringing the surface of the mud plates flush with the newly laid asphalt surface. The surface is then ready for the second course, e.g., four to six inches (10.2–15.2 centimeters) thicknesses of new asphalt. Again, as with the previous course of asphalt, a shingle or other thin material will be placed on top of each mud plate before the tack coat is applied. Prior to paving, the shingle or other thin material is removed, and the tops of the mud plates are wiped with a rag soaked in vegetable oil. Altogether, two or three courses of asphalt typically are laid down and compacted by rolling machines, with each course compacted individually.

Because the core drilling diameter is larger than the diameter of the containers, after the extensions and the lighting fixtures are finally installed, an empty space remains between the extensions to which the lighting fixtures are bolted and the wall of the bore hole. This space is filled and sealed with a special type of sealant.

If the runway, taxiway, apron, or the like is being repaved instead of being newly built, the process starts by removing the lighting fixtures, any spacer rings, and the fixed-length extensions from the bottom sections of the containers. Removal is required because several inches (at least ten centimeters or more) of the existing, deteriorated pavement must be removed and milled by high speed roto-milling machines. Before milling, a plywood cover and mud plate are bolted, by means of six bolts, onto the top flange of the bottom section of the containers to prevent debris falling into the containers and to prevent damage by the milling machines to the top flange of the bottom sections. Then the pavement surface is milled down to the same elevation as the top of the mud plates. After the roto-milling is complete, the entire area is broom cleaned by brooming machines. After the roto-milling and broom cleaning of the area, the tack coat is applied. Every mud plate is covered as previously described with a shingle or other thin material, which is removed prior to laying down the asphalt pavement. Approximately four to six inches (10.2 to 15.2 centimeters) thicknesses of asphalt pavement are laid over the mud plates and the plywood covers.

Then the process as previously described (for new construction) is carried out in the same manner for repaving. Surveyors locate each container center point and mark approximate locations on the new pavement. Two-inch (5 centimeters) pilot holes are drilled to determine more precisely the actual location of the center points. Core drillings are made, and each core-drilled, compacted asphalt cylinder is removed from the core-drilling by jack hammering. The remaining smaller pieces of asphalt are removed from around the six bolts by hammer and chisel. The generated debris is cleaned out. The six bolts are removed. The mud plate and plywood cover are pried out of the bore hole. Any sheared bolt is drilled out, and the container flange retapped, making it ready to receive the new fixed-length extension and lighting fixture. The core drilling diameter is larger than the diameter of the container after the extension and the lighting fixture are finally installed, and an empty space remains between the extension to which the lighting fixture is bolted and the wall of the bore hole.

Since pavement milling contracts stipulate penalties to contractors for undermining, i.e., taking off less pavement thickness than specified, contractors protect themselves by setting the roto-milling level as low as can be done safely. In doing so, the bolt heads often are damaged either by rounding them out of shape or by shearing them off or bending them. This situation seriously increases the labor costs an electrical contractor must build into the bid, because of the difficulty of removing bolts with rounded-off heads (a socket set will not work, forcing the use of vise grips or channel locks) or drilling out the studs of bolts that have been sheared off and then having to retap the hole or holes. Removing bent bolts is also a difficult task.

If a runway, taxiway, or other aircraft ground traffic area being built is to be constructed with concrete instead of asphalt overlaid on top of the granular sub-base, the containers would be set to their final height from the beginning, rather than setting them to the elevation of the surface of the granular sub-base. This is because the concrete, whether poured in one layer or in several layers, does not require compaction by rolling machines as does asphalt.

The plywood covers and mud plates are installed to prevent having concrete enter into the container itself or into the drilled and tapped bolt holes. The concrete is poured over the height of the mud plate because, as previously described, when the lighting fixtures are installed, a portion of each fixture will be inset to keep its top side slightly above the final surface. Therefore, a portion of each lighting fixture will be under the final surface, but its top will be slightly above it.

Each mud plate thus is covered with concrete and has to be found. Location of the mud plate is simpler in this case compared to asphalt because the concrete on top of the mud plate is much thinner than the concrete surrounding the rest of the container. As a result, the thinner concrete cures faster, showing a round spot of a different shade or color than the rest of the surrounding surface. All such containers are typically positioned in a straight line and are readily locatable, as are their center points.

For the concrete installations, since the concrete above the mud plate is very thin, a cookie cutter device is placed in the concrete, from a bridge, while the concrete is still soft. The diameter of the cookie cutter device is larger than the diameter of the container below. By doing this, in concrete installations, there is no need for core drilling.

The hardened concrete is chiseled out, e.g., by hammer and chisel and breaks up easily. This chiseling is done to provide access to the six bolts on the mud plates to unbolt and remove the mud plates and plywood covers for installing the lighting fixtures and for the adjustment of their height and azimuth. The main function of the ¾ inch (1.9 centimeters) thickness plywood covers in this application is to cushion the impacts of the hammer-chiseling from acting directly against the top flange of the container extension and damaging it.

There are many costly problems and drawbacks associated with the utilization of conventional mud plates and plywood covers in conventional or prior art methods. One problem is the expense involved in using surveyors and transits to find the center point of the mud plates and mark them on the newly laid pavement. Another drawback is the requirement for drilling one or more two-inch (five centimeters) pilot holes to verify that the center point, as marked by the surveyor, is the exact actual center point of the mud plate, and to provide the necessary precision for centering the core drilling machine. A further problem involves the requirement for jack hammering out the core-drilled, compacted asphalt cylinder, after the core drilling is done to remove the core-drilled asphalt cylinder from the top of the mud plate. The many pieces of asphalt pavement created by the jack hammering must be removed and the debris loaded up on a truck, container site by container site. Hammering and chiseling out of smaller pieces of asphalt stuck to the six bolts are difficult tasks, including but not limited to doing it while kneeling down over the bore hole. Another problem is cleaning up all the small pieces chiseled out and removing them from the bore hole and from the aircraft traffic area. The conventional methods result in bolts with rounded-off heads, sheared-off heads, or bent bolts, resulting from roto-milling or jack hammering. Therefore, another drawback is dealing with such bolts while kneeling down over the bore hole, by drilling studs and retapping bolt holes, or by removing the six bolts even when none are damaged. Still another drawback of conventional methods involves the requirement for prying-out both the mud plate and the plywood cover, while kneeling down and with very little space between the edge of the mud plate and plywood cover and the wall of the bore hole.

It is therefore an object of the present invention to provide apparatus and method for adjusting with precision and simplicity the height and the azimuth of an embedded container and for aligning with efficiency, simplicity, and precision a lighting fixture installed upon the apparatus of the present invention.

A further object of the present invention is to provide apparatus and method for adjusting the height of an embedded container without having to install individual fixed-length extensions or flat spacer rings.

A still further object of the present invention is to provide apparatus and method for adjusting the height and azimuth of an array of embedded containers in a lighting system without having to install individual fixed-length extensions or flat spacer rings.

It is an object of the present invention to provide apparatus and method for adjusting with precision and simplicity the height and the azimuth of a prior art or conventional container, previously installed and embedded as an airport inset light, and for aligning with efficiency, simplicity, and precision a lighting fixture installed upon the apparatus of the present invention.

A further object of the present invention is to provide apparatus and method for adjusting the height of a prior art or conventional container, previously installed and embedded as an airport inset light, without having to install individual fixed-length extensions or flat spacer rings.

A still further object of the present invention is to provide apparatus and method for adjusting the height and azimuth of an array of prior art or conventional containers, previously installed and embedded as airport inset lights, in a lighting system without having to install individual fixed-length extensions or flat spacer rings.

It is an object of the present invention to provide an overlay protection plate apparatus and method which eliminate the need to utilize surveyors for finding the center points.

A further object of the present invention is to provide an overlay protection plate apparatus and method which eliminate the need for drilling two-inch (5.0 centimeters) pilot holes for finding the actual center points.

It is yet another object of the present invention to provide an overlay protection plate apparatus and method which eliminate the need for jack hammering to remove the core-drilled asphalt cylinder.

Another further object of the present invention is to provide an overlay protection plate apparatus and method which eliminate the need for installing plywood covers.

Yet another further object of the present invention is to provide an overlay protection plate apparatus and method which eliminate the need to remove the many smaller pieces of fragmented asphalt from the bore hole for loading onto trucks.

It is a still further object of the present invention to provide an overlay protection plate apparatus and method which eliminate all the problems associated with the destruction of the bolts experienced in conventional practices.

Also a further object of the present invention is to provide an overlay protection plate apparatus and method which eliminate the need to pry out the plates.

These and other objects of the present invention will become apparent to those skilled in the art from a careful review of the detailed description which follows.

BRIEF DESCRIPTION OF THE DRAWINGS

FIG. 3 shows FIGS. 3a-3e to provide elevation and perspective views of the overlay protection plate of the present invention, a view of one type fastener, and a view of the plug of the present invention.

SUMMARY OF THE INVENTION

The airport inset light adjustable alignment container set apparatus and method of the present invention include a light fixture support having a container base for placement as a partially embedded support for a light fixture in an airport runway, taxiway, or other aircraft ground traffic area; means on the light fixture support for holding an airport inset light; and variable length extension means connected to the container base for rotatably adjusting the azimuth alignment of an airport inset light supported by the light fixture support by about plus or minus one degree or more and for rotatably adjusting the height of an airport inset light supported by the light fixture support by about plus or minus 0.4 millimeter or more.

In one aspect, the airport inset lights alignment adjustment assembly apparatus and method include variable length extension assembly means connected to a fixed connecting flange for rotatably adjusting the azimuth alignment of an airport inset light supported by a conventional light fixture support base, e.g., one which has been previously installed without the benefit of the present invention.

The present invention further includes overlay protection plate apparatus and method for providing a light fixture support for placement as a partially embedded support for a light fixture in an airport runway, taxiway, or other aircraft ground traffic area; an overlay protection plate for protecting against paving material entering the light fixture support during airport paving operations; plate locating means for locating the position of the overlay protection plate after the airport paving operations have covered over the overlay protection plate; and plate withdrawal means for removing the covered overlay protection plate, wherein the plate withdrawal means is capable of removing the pavement cover in substantially one piece over the overlay protection plate. In one aspect, the plate locating means and method include providing a ferrous center point rod connected to the overlay protection plate and a magnetic detecting device for locating the center point rod buried in pavement. The overlay protection plate of the present invention is firmly held bolt-free on the light fixture support until the overlay protection plate, together with the pavement covering it in one piece, are to be lifted up and away from the light fixture support.

DETAILED DESCRIPTION

The present invention provides a height and azimuth adjustable container set, utilized for all the purposes conventional embedded containers are utilized, i.e., to serve as bases for lighting fixtures, as transformer housings, and as junction boxes, but with a major difference from conventional embedded containers. The adjustable container sets of the present invention are also utilized for the precise and simplified, economic adjusting of the height of the lighting fixture to be mounted upon it. Also, the adjustable containers of the present invention provide for precise and simplified, economic aligning of the azimuth of the lighting fixtures and aligning the lights with respect to each other, by virtue of the azimuth alignment.

The adjustable container set of the present invention is used to completely replace the old art, while being efficiently and economically adjustable. These containers are installed in airport runways, taxiways, and other aircraft ground traffic areas to serve as bases for lighting fixtures, transformer housings, and junction boxes. The adjustments take place when the containers and their lighting fixtures are initially installed, e.g., when new runway, taxiway, and other aircraft ground traffic areas are first built and every time they are repaved.

The invention includes an adjustable container, with an inverted flange on one end. The flange has Acme threads in its center hole. The apparatus and method of the present invention also include an outside Acme threaded adjustable extension, which threads down into the adjustable container's inverted flange, to provide the precise height required and the precise alignment of its lighting fixture. The adjustable height extension has a top flange to provide a base upon which the specified lighting fixture can be bolted.

The present invention provides height and azimuth adjustable container sets utilized for the more efficient and economic, precise, and simplified adjusting of the heights of embedded containers and the alignment of their light fixtures. These containers are installed in airport runways and taxiways to serve as bases for lighting fixtures, as transformer housings, and as junction boxes.

Figures 1, 1A:
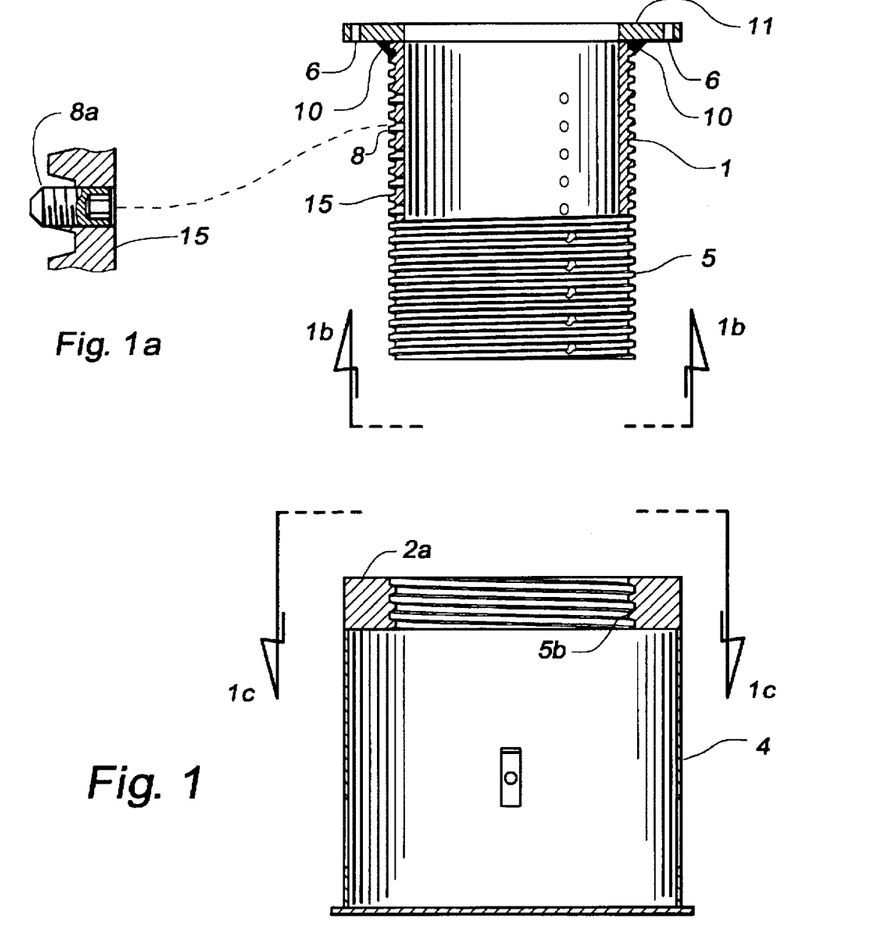
FIG. 1 is a side elevation view, partially in section, of an adjustable container of the present invention.
FIGS. 1a-1c show detailed, sectional, and plan views of the adjustable container.
Figure 1B:
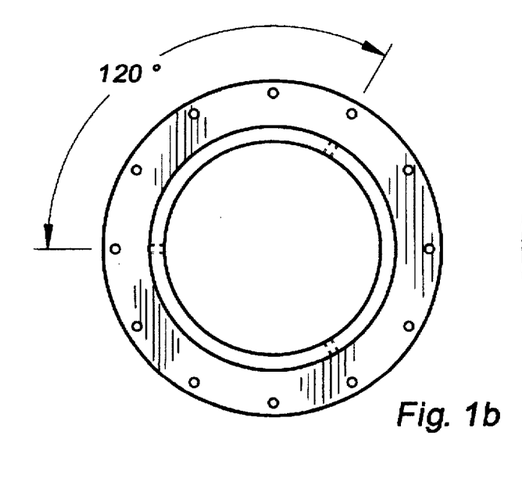
Figure 1C:
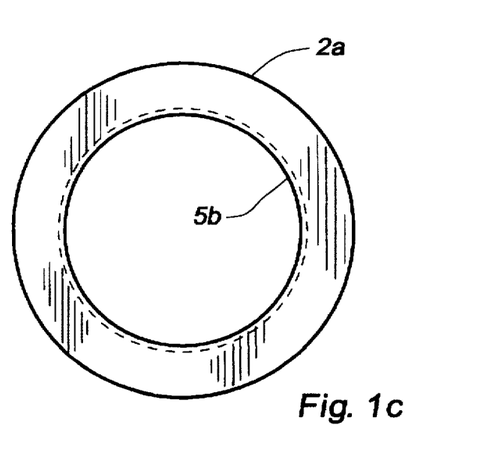

Referring now to FIG. 1, adjustable extension 1 of cylindrical form has Acme threads 5 on the full length of its outside surface. It has been found that four threads per inch (2.54 per centimeters) provide a smooth, precise, and quick height adjustment capability. Adjustable extension 1 is continuously welded at 10 at its upper end to flange 11. The bolt circle on flange 11 and the bolt circle on the light fixture (not shown) are identical because flange 11 is to be used as the new base for installing the lighting fixtures previously bolted to the inverted flange on the fixed-length extension that was bolted onto existing embedded container 3 (FIG. 2), or for installing new lighting fixtures if the old lighting fixtures are being replaced.

Adjustable extension 1, along wall 15 of its cylindrical body, has ten sets of three each threaded holes 8, at 120 degrees from each other, threaded for ⅜ of one inch (9.525 millimeters), stainless steel, Allen set screws 8a.

The Allen set screws 8a provide the means for locking adjustable extension 1 onto flange 2a of adjustable container 4. The adjustable extension 1 is also used in runways, new taxiways and other new aircraft ground traffic areas, where the "old art" containers are being installed.

Inverted flange 2a, which is on one end of adjustable container 4, has its center hole threaded with 4 Acme threads per inch 5b, (2.54 centimeters), the same threads as the outside length of adjustable extension 1, which will be threaded into the flange 2a.

For new installations, where the new adjustable container sets of the present invention are installed, adjustable containers 4 as shown in FIG. 1 are utilized. The adjustable containers 4 have inverted flange 2a, welded on one end. The flange 2a has its center hole threaded with 4 Acme threads 5b per inch (2.54 centimeters), the same threads as the outside length of adjustable extension 1, which will be threaded into the flange 2a.

For new installations, where the new, adjustable containers of the present invention are being installed, the adjustment process starts by threading adjustable extension 1 into the center hole of flange 2a of adjustable container 4. The center hole is threaded with 4 Acme threads per inch (2.54 centimeters), the same as extension 1, as previously described.

Therefore, the height and azimuth adjustments are achieved by threading adjustable extension 1 down into flange 2a, up to the precise height adjustment and the precise azimuth alignment required. The light fixture has to be temporarily bolted onto flange 11, in order to do the adjustments, and two bolts are sufficient for this purpose. After the adjustments are completed, tick marks are made on the pavement, the light fixture, and flange 2a before the light fixture is removed. After removing the light fixture, the adjustable extension 1 is firmly secured in that position to flange 2a by means of three stainless steel Allen set screws 8a, which are threaded in through holes 8, drilled, and tapped on wall 15 of adjustable extension 1. The screws 8a also provide the required resistance to torque applied perpendicularly to the vertical axis of adjustable extension 1.

Thus, it can be seen that novel apparatus and method are provided for adjusting the heights and azimuth of new embedded containers used for light bases, transformer housings, and junction boxes, in a manner that assures that the heights can be adjusted with a greater precision and simplicity because an Acme threaded adjustment assembly has been introduced, which allows increases in heights as small as 1/64 of one inch (0.4 millimeter) and smaller. Four complete turns of adjustable height extension 1 adjust to provide one inch (2.54 centimeters) in height. Further, the light fixtures can be aligned with respect to one other in a precise, straight line, providing great precision and simplicity, because the flange upon which the light fixture is bolted can be rotated in the horizontal plane any number of degrees required for azimuth correction. Further, no fixed-length extensions or flat spacer rings are required for height adjustments because the adjustable container set of the present invention provides precise adjustments of the container's height, as well as the precise adjustments of height and azimuth of the lighting fixture they support.

Figures 2, 2A:
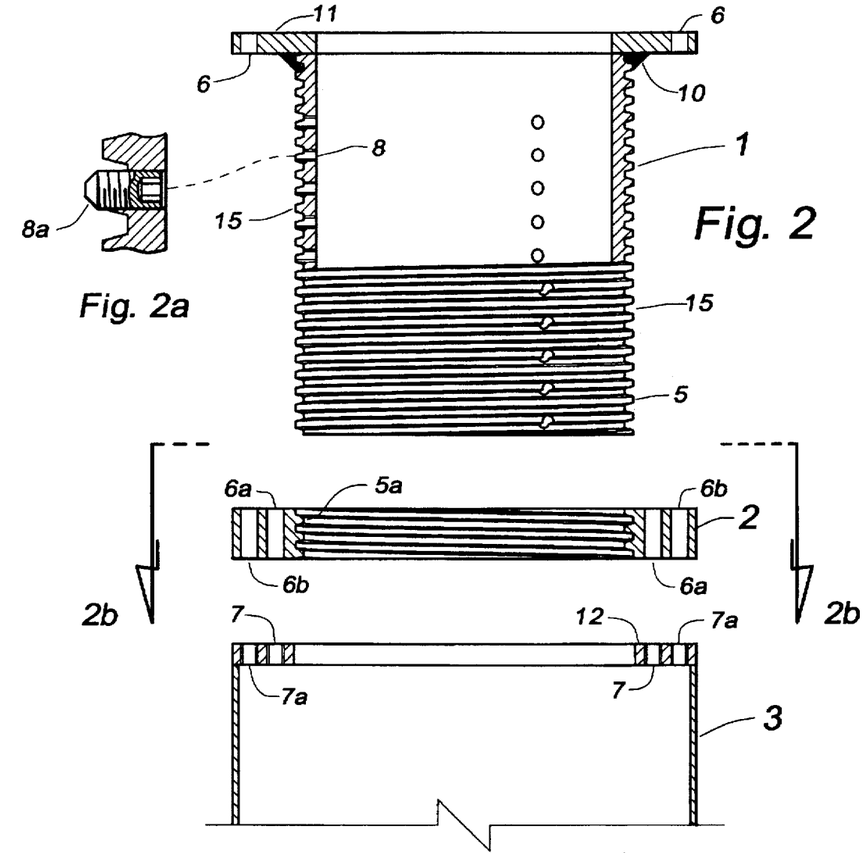
FIG. 2 is a side elevation view, partially in section, of an adjustable container of the present invention as applied to existing embedded containers.
FIGS. 2a and 2b show a detailed view and a plan view of the adjustable container.
Figure 2B:
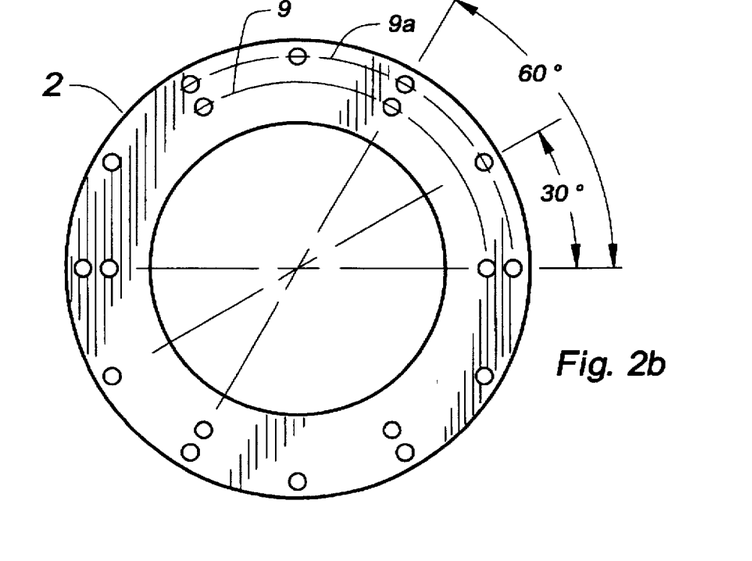

FIG. 2 shows a schematic of the adjustable extension 1 and its adapter flange 2 which, when combined, form the adjustment assembly of the present invention as applied to an existing embedded container. The bolt circles/patterns 9 and 9a for the adapter flange 2 are shown in FIG. 2b. Adapter flange 2 bolts onto one of the two possible bolt circles/patterns that can be found on the embedded container's flange. The existing embedded containers are manufactured either with bolt circle/pattern 9, which means with 6 holes, or with bolt circle/pattern 9a, which means with 12 holes. An outside Acme-threaded adjustable extension 1 threads down into the adapter flange 2 to provide the precise height required and the precise azimuth alignment of its light fixture and which adjustable extension 1 has at its top a flange 11 to provide a base upon which the specified light fixture can be bolted.

Referring now to FIG. 2, adjustable extension 1 and adapter flange 2 combined designate the adjustment assembly of the present invention. Existing container 3 has a height to be adjusted upwardly. The two bolt circles/bolt patterns 9 and 9a are drilled in adapter flange 2.

Adjustable extension 1 is of tubular form and has Acme threads 5 on its outside surface. Four threads per inch (2.54 centimeters) have been found to provide a smooth, precise, and quick height adjustment capability. Adjustable extension 1 has flange 11 continuously welded 10 to its upper end. The bolt circle 6 on flange 11 and the bolt circle on the light fixture (not shown) are identical because flange 11 is to be used as the new base for installing the lighting fixture previously bolted to inverted flange 12 on embedded container 3, or for installing new ones if the old lighting fixtures are replaced or if it is a completely new installation of conventional containers.

Adjustable extension 1, along wall 15 of its tubular body, has ten sets of three each threaded holes 8, at 120 degrees from one another, threaded for ⅜ of one inch (9.525 millimeters), stainless steel, Allen set screws 8a. The Allen set screws 8a provide means for locking adjustable extension 1 onto adapter flange 2.

Adapter flange 2 has its inside surface threaded with four Acme threads 5a, the same threads as the adjustable extension 1, which will be threaded into the adapter flange 2.

Adapter flange 2 has two bolt circles/patterns 9 and 9a to be able to install adapter flange 2 on any of the two possible embedded containers 3, i.e., the one piece container or the sectional container. Adapter flange holes 6a and 6b are not threaded, and they are large enough to allow for an easy alignment with holes 7 or 7a, whichever is found on inverted flange 12 of embedded container 3, to which adapter flange 2 is to be bolted.

The adjustment process starts by bolting adapter flange 2 onto embedded container flange 12. When bolted, the height and azimuth adjustments are achieved by threading adjustable extension 1 down into adapter flange 2 up to the precise height adjustment and the precise azimuth alignment required. The light fixture has to be temporarily bolted onto flange 11, to do the adjustments. Two bolts are sufficient for this purpose. Tick marks are made on the pavement, the light fixture, and adapter flange 2 before the light fixture is removed. After removing the light fixture, the adjustable extension 1 is firmly secured in that position, to adapter flange 2, by means of three stainless steel Allen set screws 8a threaded in through holes 8, drilled, and tapped on wall 15 of adjustable extension 1. The screws 8a also provide the required resistance to torque applied perpendicularly to the vertical axis of adjustable extension 1.

Embedded container 3 as well as adapter flange 2 and adjustable extension 1, when set in their embedded position in concrete, are never again required to be removed (from concrete) but still can be adjusted as to height or azimuth alignment. For bituminous pavement projects, the adjustable extension 1 can be either adjusted downward or completely removed to allow for roto-milling and then can be reinstalled quickly and conveniently.

Thus, the novel apparatus and method of the present invention provide for adjusting the heights and azimuths of embedded containers used for light bases, transformer housings, and junction boxes, in a manner that assures (1) that the heights can be adjusted with a greater precision because an Acme threaded adjustment assembly has been introduced, which allows increases in height as small as 1/64 of one inch (0.4 millimeter) or smaller; (2) that the light fixtures can be aligned with respect to one another in a precise, straight line, with simplicity, because the flange upon which the light fixture is bolted can be rotated in the horizontal plane any number of degrees required for azimuth correction; and (3) that no fixed-length extensions and no flat spacer rings are required for height adjustments because an adjustable extension is provided with which precise adjustments can be easily, efficiently, and economically made to any of the required heights.

Referring now to FIGS. 3a–3e, plate 21 of the overlay protection plate of the present invention has a drilled center hole through its center point. Threaded nut 25 is aligned with the center hole. Nut 25 is welded at 40 to the bottom side of the plate 21.

Figures 3A, 3B, 3C, 3E:
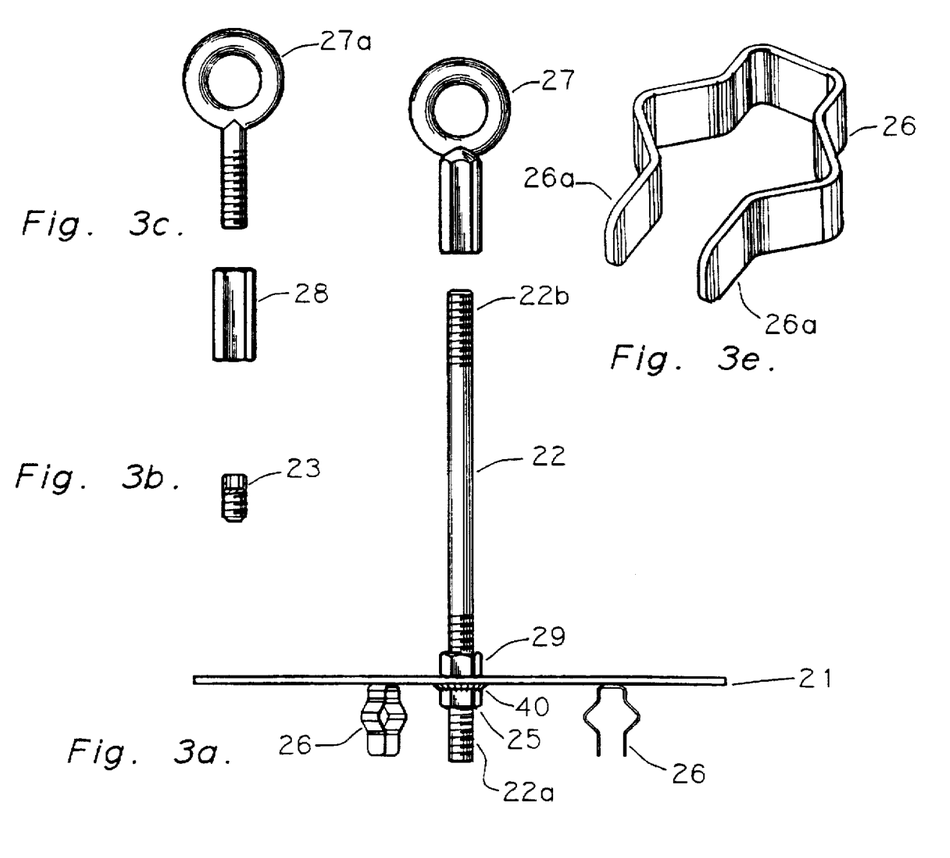
Figure 3D:
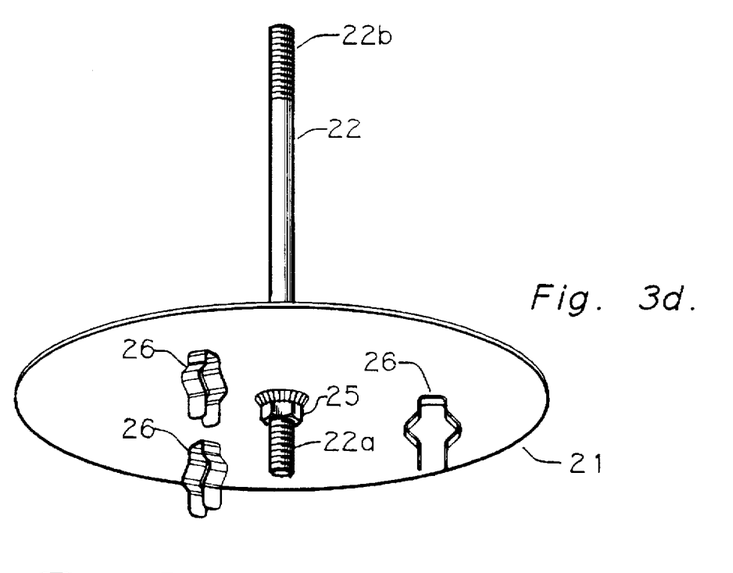

Center point rod 22 has its bottom end 22a and its top end 22b threaded. The section of the center point rod 22 between the two threaded ends is not threaded.

Prior to threading in bottom end 22a of center point rod 22 through bottom side threaded nut 25, the bottom end 22a is threaded in throughout threaded nut 29. Then center point rod 22 is threaded, from the top side of plate 21, through bottom side threaded nut 25, so that threaded nut 29 remains threaded onto center point rod 22, on the top side of plate 21.

Center point rod 22 has its top end 22b threaded. When the threads on top end 22b are exposed, either a female threaded eye bolt 27 or a female threaded coupling 28 and a male threaded eye bolt 27a are threaded onto the threaded top end 22b.

Prior to the roto-milling of existing runways, taxiways, and other aircraft ground traffic surfaces and prior to installing the overlay protection plate of the present invention, threaded plug 23 (FIG. 3b) is installed on plate 21, from its top side and through the drilled hole, through the center point of plate 21 and onto threaded nut 25. Spring expansion fasteners 26 have setting points 26a for making a press-fit attachment to set-in-the-ground airport lighting fixture supports.

Figure 4:
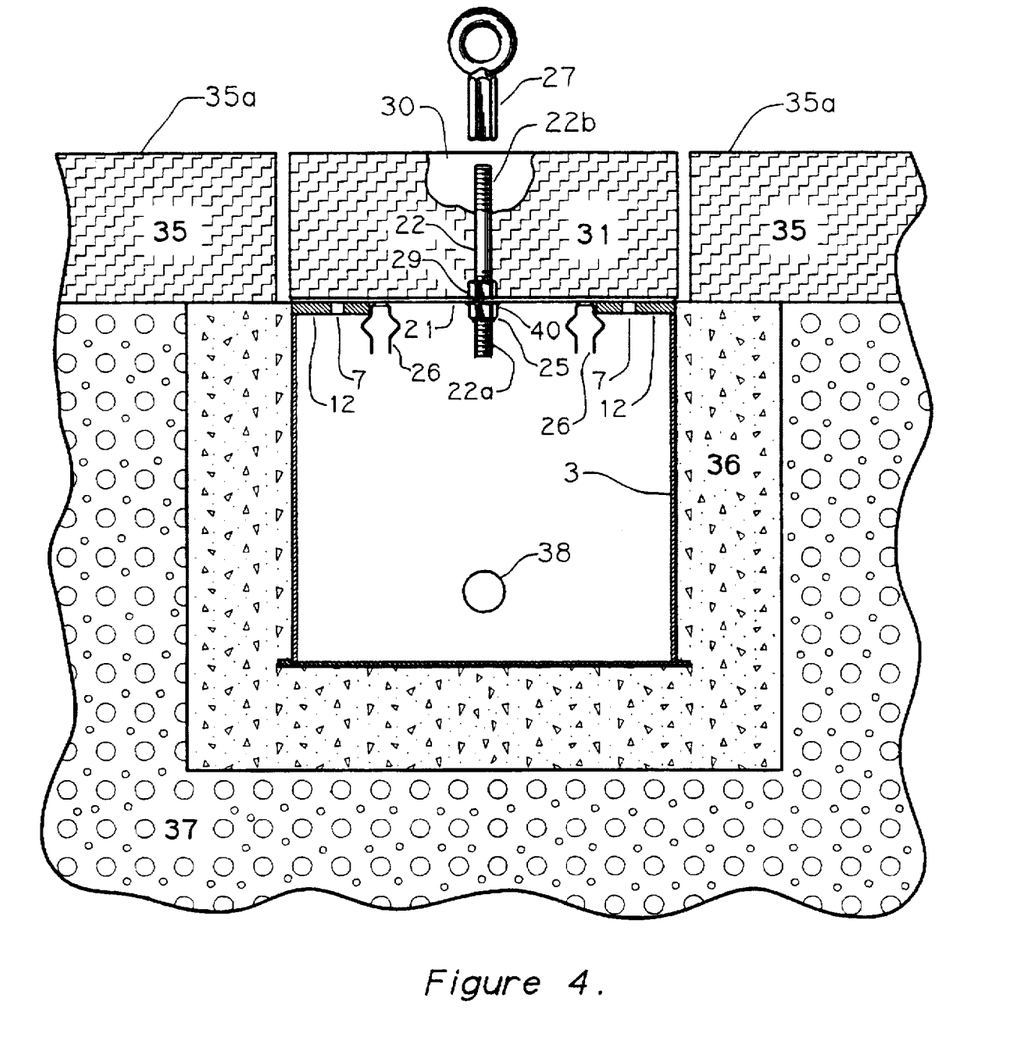
FIG. 4 shows an elevation view, partially in section, of the overlay protection plate of the present invention installed upon a bottom section container with a core-drilled cylinder of compacted asphalt pavement on the overlay protection plate.

Referring now to FIG. 4, the overlay protection plate of the present invention preferably requires round plate 21, made of steel or other similar material, to have a diameter approximately equal to the diameter of bottom section container 3. The round plate material is of a thickness capable of supporting the weight of core-drilled, compacted asphalt cylinder 31, which is lifted by the overlay protection plate of the present invention.

Bottom container 3 is generally set in concrete 36 in the granular sub-base fill 37 that generally constitutes the sub-base of the runways, taxiways, and other aircraft ground traffic surfaces and upon which sub-base are laid the various layers of asphalt (bituminous) pavement 35. Aperture 38 provides access for electrical conduit to container 3.

The overlay protection plate of the present invention provides method and means for its firm attachment to bottom section container 3.

Continuing now to refer to FIG. 4, the overlay protection plate of the present invention has several spring expansion fasteners 26, which are used to snap shut opening 39 (FIG. 5) on flange 12 of bottom section container 3 or of opening 39b (FIG. 7) on flange 12b of fixed-length extension 41 (FIG. 7) or of flange 2, 2a, or 11 of the novel adjustable containers (FIGS. 1 and 2) of the present invention, by pushing fasteners 26 down into openings 39 or 39b. The firm closing of openings 39 or 39b is accomplished by simply setting the overlay protection plate of the present invention on top of flanges 12 or 12b (FIG. 7), with setting points 26a (FIG. 3e) of spring fasteners 26, into opening 39 or 39b, then pushing down on the top side of plate 21, forcing spring fasteners 26 down into openings 39 or 39b to firmly attach the overlay protection plate of the present invention to container 3 or to extension 41, by a strong spring action of spring expansion fasteners 26, pressing against flange 12 or 12b through opening 39 or 39b. The described method and means for attaching the overlay protection plate of the present invention to container 3 or to fixed-length extension 41 eliminates the need for bolts.

The closing of the opening on the top flange 12 of bottom container 3 or of opening on the top flange 12b of fixed-length extension 41 is required in order to prevent asphalt pavement materials or other debris from falling into the bottom container 3. Asphalt pavement materials or debris can fall into container 3 when the airport runways, taxiways, and other aircraft ground traffic surfaces are first built and also when these surfaces are milled down by roto-milling machines and again when a new layer 35 of asphalt pavement is laid down to bring the elevation of the pavement surface 35a to the level specified.

The overlay protection plate of the present invention is installed on bottom container 3 or on fixed-length extension 41 (FIG. 7) or of flange 2, 2a, or 11 of the novel adjustable containers (FIGS. 1 and 2) of the present invention prior to laying down asphalt pavement 35. In cases of repavement of existing runways, taxiways, and other aircraft ground traffic surfaces, an existing layer of bituminous pavement is removed by high speed roto-milling machines, prior to laying down new bituminous pavement 35. When roto-milling is to take place, the overlay protection plate of the present invention is installed prior to the roto-milling.

Prior to the roto-milling of existing runways, taxiways, and other aircraft ground traffic surfaces and prior to installing the overlay protection plate of the present invention, threaded plug 23 (FIG. 3b) is installed on plate 21, from its top side and through the drilled hole, through the center point of plate 21 and onto threaded nut 25 in order to prevent debris from falling into the bottom section 3 through the drilled center hole. After the roto-milling process and after all roto-milling debris has been cleaned out by the roto-milling contractor, plug 23 is removed and center point rod 22 is installed, prior to laying down any new asphalt pavement 35.

Center point rod 22 is threaded into bottom nut 25 so as to position top end 22b of rod 22 up to a height about one-half inch (1.3 centimeters) below the surface 35a of the new layer of bituminous pavement 35 to be laid down. When center point rod 22 is set to the specified height, top side threaded nut 29 is screwed down and tightened against the top side of plate 21, so as to lock center point rod 22 at the set height. Prior to laying down the new pavement 35, center point rod 22 and the top side of plate 21 are lightly wiped with rags soaked in vegetable oil, in order to prevent asphalt pavement from sticking to them.

In cases where there is no roto-milling of an existing asphalt pavement, there is no need then for installing plug 23 (FIG. 3b). Instead, center point rod 22 is installed directly to plate 21 and bottom nut 25.

Center point rod 22 is utilized for finding the center point of the overlay protection plate of the present invention which corresponds with the center point of opening 39 on bottom container 3. The center point also corresponds with the center point of opening 39b on fixed-length extension 41. The center points are on the same axis but at different elevations.

After new pavement 35 is laid down, the overlay protection plate of the present invention and its center point rod 22 are buried under new asphalt pavement 35. This creates the need for core-drilling the asphalt pavement 35 laid on top of the overlay protection plate of the present invention in order to be able to remove it and to proceed with the process of completing the installation of the runway, taxiway, and other aircraft ground traffic area lighting systems.

Figure 5:
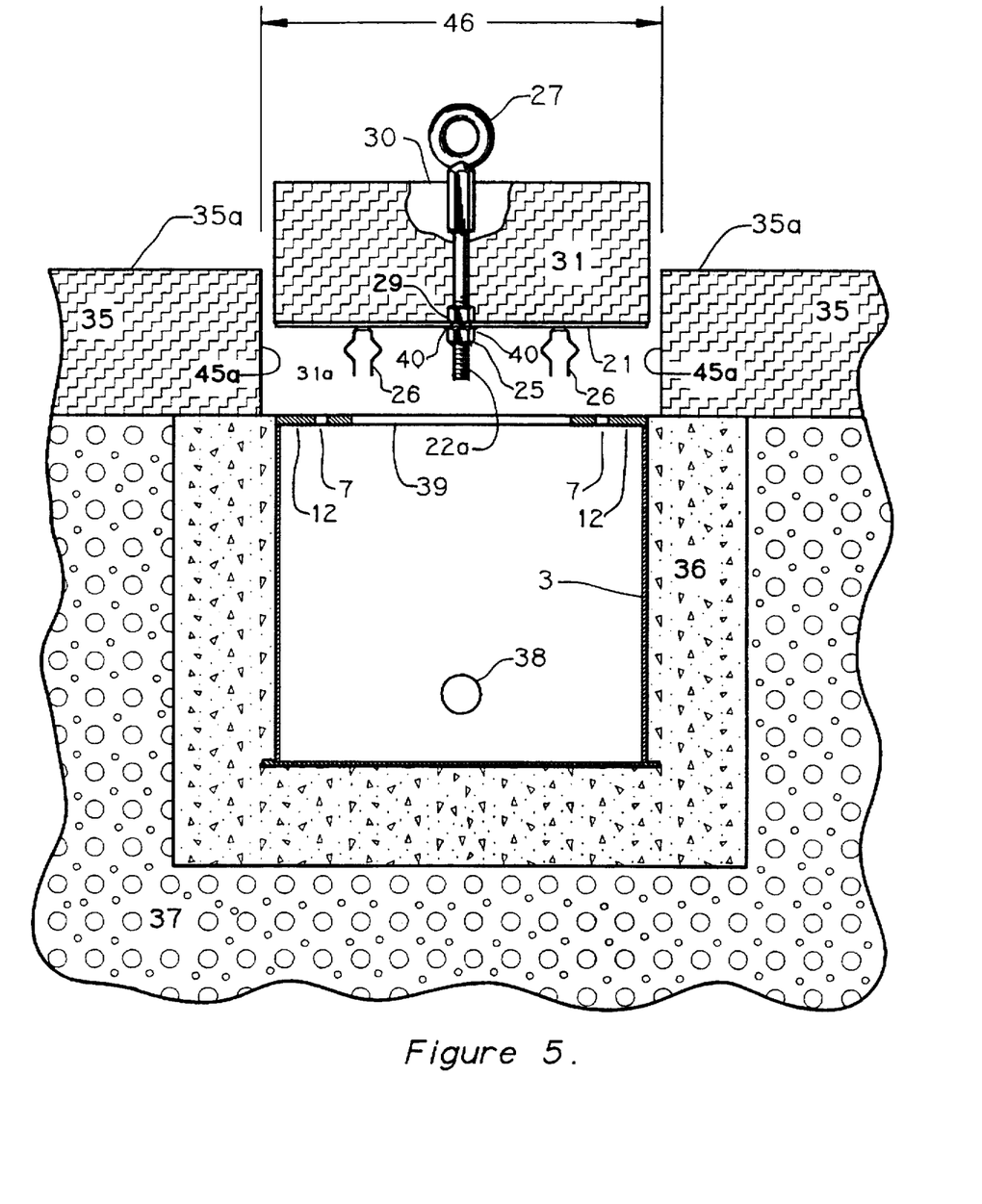
FIG. 5 shows an elevation view, partially in section, of the overlay protection plate of the present invention, which has been pulled and lifted up from the bottom section container to which it was attached, and a core-drilled cylinder of compacted asphalt pavement on it.
Figure 6:
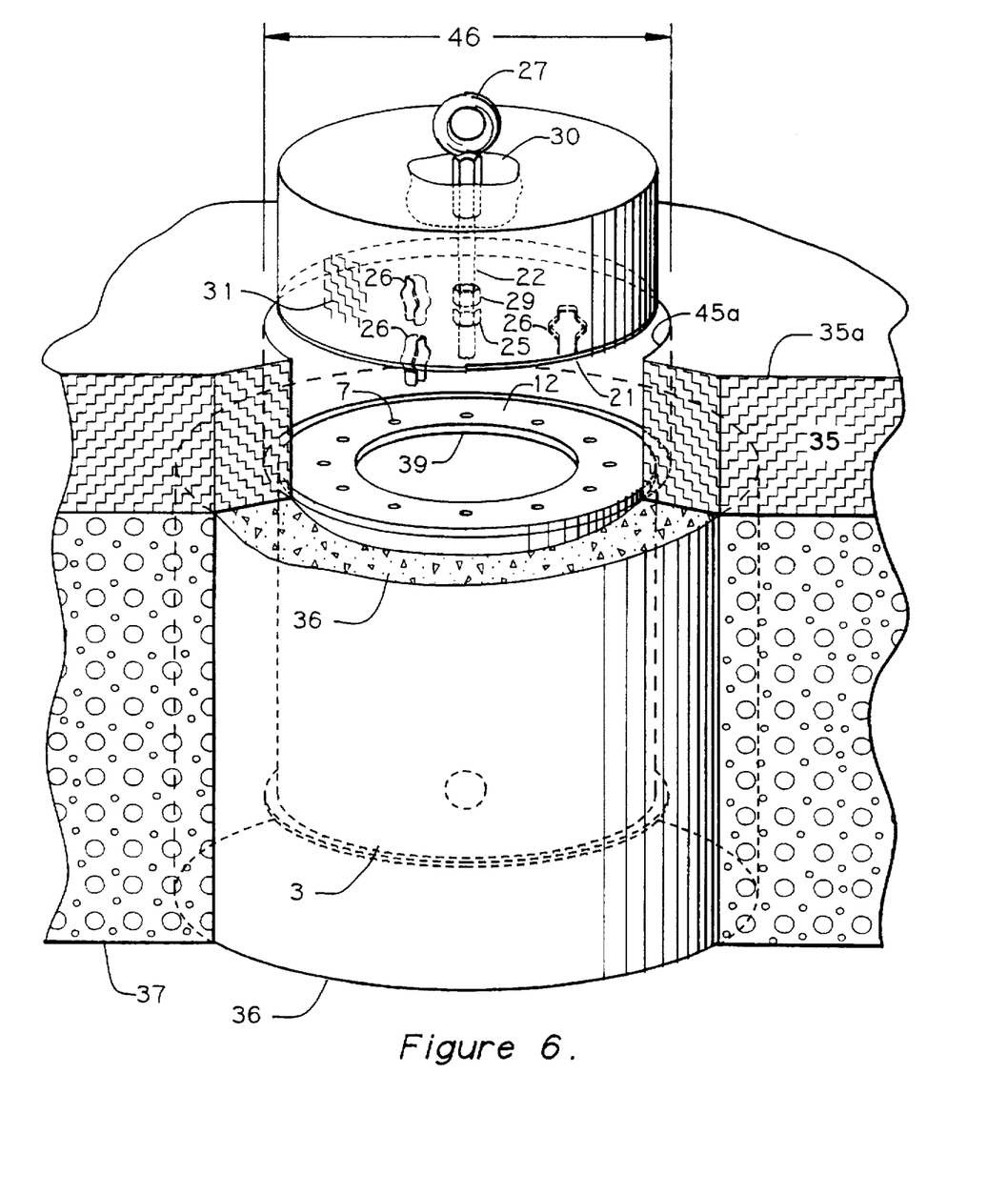
FIG. 6 shows a perspective view of the overlay protection plate of the present invention, which has been pulled and lifted up from the bottom section container to which it was attached, and a core-drilled cylinder of compacted asphalt pavement on it.

Referring now to FIG. 5 and FIG. 6, the core-drilling diameter 46 is approximately one inch (2.54 centimeters) larger than the diameter of the bottom container 3 in order to prevent container 3 from being damaged by a core-drilling bit, hence the requirement for establishing with precision the location of the center point to correctly position the core-drilling bit.

The top end 22b (FIG. 4) of center point rod 22, prior to laying the new pavement 35, is set in height at about one-half inch (1.3 centimeters) below the final pavement surface 35a. Rod 22 is locked into that position at the center point of the overlay protection plate of the present invention, which is on the same axis as the center point of container 3 or extension 41, whichever the case might be.

The top end 22b of center point rod 22 is positioned close to surface 35a of the new pavement 35 and is then found by any magnetic detecting device, eliminating the requirement to utilize surveyors with transits and drilling of two-inch (5 centimeters) pilot holes, for the finding of the center points. When the top end 22b of center point rod 22 is found, a small hole 30 is chipped away on surface 35a to provide access to top end 22b of center point rod 22.

When center point rod 22 is found, a precise centering reference point has been established for positioning the core-drilling bit.

After either eye bolt 27 or 27a is installed, the overlay protection plate of the present invention is readily detached from container 3 or fixed-length extension 41, carrying on the top side of plate 21 the core-drilled, compacted asphalt cylinder 31, in one piece. This is accomplished by hooking any available lifting device (not shown) onto eyebolt 27 or 27a and lifting up and away the overlay protection plate of the present invention, carrying on it the core-drilled, compacted asphalt cylinder 31 from bore hole 31a. The spring expansion fasteners 26 allow the overlay protection plate of the present invention to be detached from container 3 or fixed-length extension 41 when pulled up.

Among the many lifting devices which can be used are backhoes, truck-mounted winches, truck-mounted hydraulic arms, and other devices generally found at similar construction projects. The entire core-drilled asphalt cylinder 31 can be deposited, in one piece, by the lifting device, directly onto trucks.

The overlay protection plate of the present invention is then removed by tapping with a block of wood on the top end 22b of center point rod 22.

Because the overlay protection plate of the present invention is lifted right out of bore hole 31a carrying on it the core-drilled, compacted asphalt cylinder 31, there is no need to pry out overlay protection plate of the present invention. The need to breakup the cylinder by jack hammering is eliminated and, because there is no jack hammering, there is no need to install plywood covers.

Figure 7:
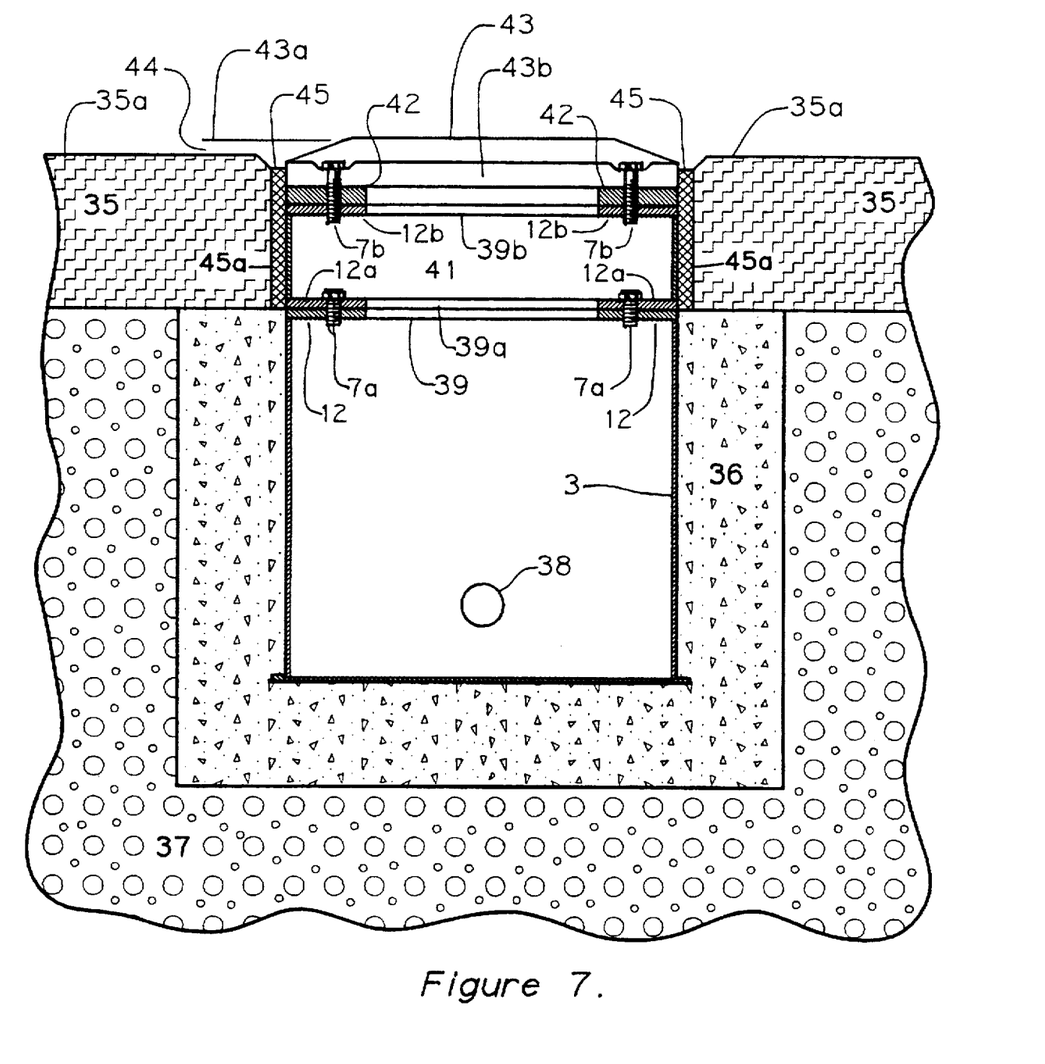
FIG. 7 shows an elevation view, partially in section, of a fixed-length extension with a spacer ring and a lighting fixture after final installation upon a bottom section container.

Referring now to FIG. 7, completion requires the installation of fixed-length extension 41, the installation of one or more spacer rings 42 for height adjustment, and finally the installation of the light fixture 43. The top 43a of light fixture 43 is slightly above surface 35a of new pavement 35.

The removal of core-drilled, compacted asphalt cylinder 31 from the core-drilled hole 31a allows the contractor to proceed with the installation of fixed-length extension 41, by bolting its bottom flange 12a to the top flange 12 of bottom container 3 by means of six bolts 7a and by then bolting any additional height adjustment spacer rings 42 together with lighting fixture 43, by means of six bolts 7b to the top flange 12b of fixed-length extension 41.

The top portion 43a of lighting fixture 43 is set slightly above the surface 35a of the newly installed pavement 35 as indicated on the drawing by numeral 44.

The space 45a between the wall of the bore hole 31a and the fixed-length extension 41, spacer ring 42, and the bottom flange 43b of lighting fixture 43 then is sealed off with a special sealant 45.

Thus, it can be seen that novel apparatus and method have been provided for the protection of containers used in runways, taxiways, and other aircraft ground traffic areas as light bases, transformer housings, junction boxes, and accessories, in a manner that assures quick installation and removal, expeditious location when buried, the quick establishing of its precise center point, the capacity of lifting with it, in one piece, a heavy, core-drilled asphalt cylinder, and serving as the means for supporting the weight of a heavy, core-drilled asphalt cylinder when being lifted onto a disposal vehicle.

Thus it can be seen that the invention accomplishes all of its objectives.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

I claim:

1. An airport inset light adjustable alignment container set apparatus, comprising:
   (a) a light fixture support having a non-threaded vertical wall container base for placement as a partially embedded support for a light fixture in an airport runway, taxiway, or other aircraft ground traffic area;
   (b) means on said light fixture support for holding an airport inset light; and
   (c) means for providing variable length extension of said light fixture support and for rotatably adjusting the azimuth alignment of said airport inset light by about plus or minus one degree or more and for rotatably adjusting the height of said airport inset light by about plus or minus 1/64 of one inch or more.

2. An airport inset light adjustable alignment container set apparatus as set forth in claim 1, wherein said means for providing said variable length extension comprises:
   (d) an extension adapter flange and
   (e) a light support extension canister having outside screw threading means for rotatable attachment to an inside thread on said extension adapter flange provided by an Acme screw thread of at least about 4 threads per inch.

3. An airport inset light adjustable alignment container set apparatus as set forth in claim 1, wherein said means for providing said variable length extension comprises:
   (d) a light support extension canister and
   (e) light attachment means on a top flange of said light support extension canister for securing an airport inset light to at least one of a plurality of at least 12 bolt holes spaced substantially equally apart and positioned up to 30 degrees apart in the top flange of said light support extension canister.

4. An airport inset light adjustable alignment container set apparatus as set forth in claim 3, wherein said means for providing said variable length extension further comprises:
   (f) an extension adapter flange and
   (g) rotation locking means for securing said light support extension canister against further rotation through said screw threading means connected to said extension adapter flange.

5. An airport inset lights alignment adjustment assembly apparatus, comprising:
   (a) a light fixture non-threaded vertical wall support base for placement as a partially embedded light fixture in an airport runway, taxiway, or other aircraft ground traffic area;
   (b) a fixed connecting flange on said light fixture non-threaded vertical wall support base for holding an airport inset light; and
   (c) variable length extension assembly means connected to said fixed connecting flange for rotatably adjusting the azimuth alignment of an airport inset light by about plus or minus one degree or more and for rotatably adjusting the height of an airport inset light by about plus or minus 1/64 of one inch or more, said variable length extension assembly means comprising:
   (i) an extension adapter flange having connecting means for attachment to said fixed connecting flange on said light fixture non-threaded vertical wall support base; and
   (ii) a light support extension canister having outside screw threading means for rotatable attachment to an inside thread on said extension adapter flange provided by an Acme screw.

6. An airport inset lights alignment adjustment assembly apparatus as set forth in claim 5, wherein said variable length extension means comprises a light support extension canister having outside screw threading means for rotatable attachment to an inside thread on said extension adapter flange provided by an Acme screw thread of at least about 4 threads per inch.

7. An airport inset lights alignment adjustment assembly apparatus as set forth in claim 6, wherein said variable length extension means comprises a light support extension canister having outside screw threading means for rotatable attachment to an inside thread on said extension adapter flange provided by an Acme screw thread of at least about 4 threads per inch and less than about 7 threads per inch.

8. An airport inset lights alignment adjustment assembly apparatus as set forth in claim 7, wherein said variable length extension means comprises light attachment means on the top surface of said light support extension canister for securing an airport inset light to at least one of a plurality of at least 12 bolt holes spaced substantially equally apart and positioned up to 30 degrees apart in the top surface of said light support extension canister.

9. An airport inset lights alignment adjustment assembly apparatus as set forth in claim 8, wherein said variable length extension means comprises rotation locking means for securing said light support extension canister against further rotation through said screw threading means connected to said extension adapter flange.

10. An airport inset light overlay protection plate apparatus, comprising:
   (a) a light fixture support for placement as a partially embedded support for a light fixture in an airport runway, taxiway, or other aircraft ground traffic area;
   (b) an overlay protection plate for protecting against paving material entering said light fixture support during airport paving operations;
   (c) plate locating means for locating the position of said overlay protection plate after said airport paving operations have covered over said overlay protection plate, said plate locating means comprising:
   (i) a ferrous center point rod having a threaded bottom end connected to said overlay protection plate through a threaded center hole at about the plate center point and a threaded top end capable of being positioned to set a rod height of about one-half inch below the final pavement surface;
   (ii) a magnetic detecting device for locating said center point rod when buried in pavement; and
   (d) plate withdrawal means for removing said covered overlay protection plate, wherein said plate withdrawal means is capable of removing the pavement cover in substantially one piece over said overlay protection plate, said plate withdrawal means comprising:
   (i) a threaded top end on said center point rod; and
   (ii) a threaded eyebolt or coupling for attachment to said threaded top end.

11. An airport inset light overlay protection plate apparatus as set forth in claim 10, wherein said plate withdrawal means further is capable of forming an opening in said airport pavement for providing light fixture installing access to said light fixture support.

12. An airport inset light overlay protection plate apparatus as set forth in claim 11, further comprising at least two spring expansion fasteners fixed to the bottom of said overlay protection plate, for holding said overlay protection plate bolt-free on said light fixture support.

13. An airport inset light overlay protection plate apparatus as set forth in claim 12, further comprising a threaded plug for said center hole.

14. An airport inset light overlay protection plate apparatus as set forth in claim 10, further comprising means for core-drilling said pavement cover over said overlay protection device for producing a drilled asphalt cover core diameter about one inch larger than the diameter of said light fixture support.

15. An airport inset light overlay protection plate apparatus as set forth in claim 10, wherein said plate withdrawal means is capable of forming an opening in said airport pavement for providing light fixture installing access to said light fixture support.

16. A method of adjusting the height and alignment of an airport inset light, comprising:
   (a) providing a light fixture support for an airport runway, taxiway, or other aircraft ground traffic area, said fixture containing a non-threaded vertical wall container base for partially embedded placement in an airport runway, taxiway, or other aircraft ground traffic area and means for holding an airport inset light;
   (b) providing a fixed connecting flange on said non-threaded vertical wall container base and further providing an extension adapter flange having connecting means for attachment to said fixed connecting flange on said light fixture non-threaded vertical wall support base; and
   (c) rotatably adjusting the azimuth alignment of said airport inset light supported by about plus or minus one degree or more and the height of said light by about plus or minus 1/64 of one inch or more.

17. A method of adjusting the height and alignment of an airport inset light as set forth in claim 16, wherein said connecting means comprises providing outside screw threading means on said extension adapter flange for rotatable attachment to an inside thread on said fixed connecting flange provided by an Acme screw thread of at least about 4 threads per inch.

18. A method of adjusting the height and alignment of an airport inset light as set forth in claim 17, further comprising securing said light support extension canister against further rotation through said screw threading means connected to said extension adapter flange.

19. A method of protecting an airport inset light support, comprising:
   (a) providing a light fixture support for partially embedded placement in an airport runway, taxiway, or other aircraft ground traffic area and having means for holding an airport inset light;
   (b) providing an overlay protection plate for protecting against paving material entering said light fixture support during airport paving operations;
   (c) locating the position of said overlay protection plate after said airport paving operations have covered over said overlay protection plate by connecting a ferrous center point rod to said overlay protection plate at about the plate center point and magnetically detecting said center point rod buried in pavement; and
   (d) removing said covered overlay protection plate together with the pavement cover in substantially one piece over said overlay protection plate.

20. A method of protecting an airport inset light support as set forth in claim 19, further comprising holding said overlay protection plate on said light fixture support bolt-free by press-fit attachment.

* * * * *